United States Patent [19]

Jodlbauer

[11] Patent Number: 5,176,935

[45] Date of Patent: Jan. 5, 1993

[54] BAKING AGENT FOR BREAKFAST ROLL DOUGHS

[75] Inventor: Heinz D. Jodlbauer, Berlin, Fed. Rep. of Germany

[73] Assignees: Vereinigte Kunstmuhlen AG; A. Nattermann & Cie. GmbH, both of Fed. Rep. of Germany

[21] Appl. No.: 899,214

[22] Filed: Jun. 16, 1992

Related U.S. Application Data

[63] Continuation of Ser. No. 643,142, Feb. 15, 1991, abandoned, which is a continuation of Ser. No. 410,011, Sep. 15, 1989, abandoned, which is a continuation of Ser. No. 50,063, May 13, 1987, abandoned.

[30] Foreign Application Priority Data

May 16, 1986 [DE] Fed. Rep. of Germany ....... 3616594

[51] Int. Cl.$^5$ .............................................. A21D 2/32
[52] U.S. Cl. .................................... 426/601; 426/611; 426/622; 426/653; 426/662
[58] Field of Search ............... 426/601, 611, 622, 653, 426/662

[56] References Cited

U.S. PATENT DOCUMENTS

| | | | |
|---|---|---|---|
| 2,773,771 | 12/1956 | Julian et al. | 426/662 X |
| 3,060,030 | 10/1962 | Obenauf | 426/662 X |
| 4,443,378 | 4/1984 | Gunther | 260/403 |
| 4,452,743 | 6/1985 | Gunther | 260/403 |
| 4,482,474 | 11/1985 | Beedermann et al. | 426/662 X |
| 4,608,267 | 8/1986 | Dutelh | 426/662 |
| 4,684,526 | 8/1987 | Kruzcitly | 426/662 X |

FOREIGN PATENT DOCUMENTS

| | | |
|---|---|---|
| 719268 | 4/1942 | Fed. Rep. of Germany. |
| 1183452 | 12/1964 | Fed. Rep. of Germany. |
| 3047011 | 7/1982 | Fed. Rep. of Germany. |
| 3047012 | 7/1982 | Fed. Rep. of Germany. |

OTHER PUBLICATIONS

Andres, Lecithin-A Multifunctional Ingredient, *Food Processing*, May 1983, pp. 113–115.

W. Schafer, "Grundsatze der Verwendung von Lecithin in der Backerel", *Backerei Techn.* (1972, 73), pp. 69–77.

L. Von Wassermann, "Lipide als Backmittel", *Fette Seifen Anstrichmittel*, 1983, 85, 120; DE-PS 719 268, pp. 117–121.

J. Eichberg, Kirk-Othmer, "Laminated Wood-Based Composites to Mass Transfer", *Encyclopedia of Chemical Technology*, 3rd Ed., vol. 14, pp. 250–269.

J. Coppock et al., "Glycerides in Baking", *J. Sci. Food Agric.*, Jan. 5, 1954, pp. 19–26.

H. D. Jodlbauer, "Der Einsatz von Lipidstoffen (Emulgatoren) in der Brot-und Backwarenindustrie, unter besonderer Berucksichtigung des Begriffes 'Technologische Erfordernisse'", *Abhandlungen*, ZLR 1/77, pp. 33–45.

Y. Pomeranz, "Lecithin in Baking", Chapter Thirteen, U.S. Grain Marketing Research Laboratory, Agricultural Research Service, U.S. Department of Agriculture, Manhattan, Kansas, pp. 289–315.

Y. Pomeranz et al., "Wheat Germ in Breadmaking. II. Improving Breadmaking Properties by Physical and Chemical Methods", *Cereal Chem.* (1970) 47, 435 ff, pp. 429–437.

Y. Pomeranz, "Phosphatides in Baking Wheat Germ Bread", *Food Technology*, Aug. 1970, vol. 24, 927–928, pp. 91–92.

*Primary Examiner*—Joseph Golian
*Attorney, Agent, or Firm*—Kinney & Lange

[57] ABSTRACT

A baking agent for breakfast-roll doughs includes a phospholopid fraction in which the portion of phosphatidyl choline to phosphatidyl ehtanolamine is greater than 1. A method for producing such a baking agent is also included.

5 Claims, No Drawings

BAKING AGENT FOR BREAKFAST ROLL DOUGHS

This is a continuation of application Ser. No. 07/643,142, filed on Jan. 15, 1991, abandoned which in turn is a continuation of Ser. No. 07/410,011, filed on Sep. 15, 1989, abandoned which in turn is a continuation of application Ser. No. 07/050,063 filed May 13, 1987, abandoned.

BACKGROUND OF THE INVENTION

The invention is related to a baking agent for breakfast-roll doughs and methods for producing such baking agents.

Breakfast-roll doughs are raised with yeast and produced from flour, all or the majority of which is flour obtained from wheat. Such flour contains phospholipids, which serve an important purpose during preparation of the dough in that, for example, they promote the gelatinization of the starch. After it had been discovered that lecithin contains the phospholipids of wheat, the addition of crude lecithin to the dough achieved an improvement of the baking properties of the finished breakfast-rolls.

the change from manual working to machining raised many problems in the producing of the dough. Only when lipids were added as emulsifiers, was one able to increase the knead tolerance.

the composition of the lipids occuring naturally in flour made from wheat include a series of lipid components, which are also found in crude lecithin, for example lysophosphatidyl choline, phosphatidyl choline, N-acylphosphatidyl ethanolamines, phosphatidyl inosid, phosphatidyl acid, lysophosphatide acid, phosphatidyl glycerol, lysophosphatidyl ethanolamine, lysophosphatidyl glycerol, diglycerides, monoglycerides, triglycerides, stearins and the like. The lipids found in wheat flour play a part which is not insignificant. This part can be increased very clearly by addition of lecithin or synthetic emulsifiers. However, the addition of lecithin or synthetic emulsifiers poses problems due to the particular components in the lecithin or synthetic emulsifiers as well as the ratio of the particular phospholipids in the lecithin. (L. Wassermann, Fette Seifen Anstrichmittel 1983, 85, 20; Y. Pomeranz, Food Techol 1970, 24, 928).

The roll of lipids as emulsifiers in the form of so-called crude lecithins, extracted from animal or vegetable materials, such as eggs, oliferous seeds and oilseeds, such as coconut-lopra, oil palm, peanuts, rape, sunflower kernel, sojabeans, oil palm and olives (J. Eichber, Kirk-Othmer, Encyclopedia of Chemical Technology Vol. 14 Seite 250-269) in doughs and baking masses (H. D. Jodlbauer ZLR 1977 (1) 33-45; Y. Pomeranz, Serial Chem. 1970, 47, 435 ff; Y. Pomeranz, Food Technol. 1970, 24, 928 ff; I.B.M. Coppock, J. Sci. Food Agr. 1954, 5, 19 ff; DE-PS 1183 452; J. Pomeranz in B. F. Szuhaj and G. R. List 'Lecithins' AOCS 1985) is known.

As early as the 1940's, lecithin in amounts of from 0.1 to 0.5 weight %, was employed in flour to bake bread. (L. Wassermann, Fette Seifen Anstrichmittel 1983, 85, 120; DE-PS 719 268; W. Schäfer, Bäckerei Techn. 1972, 73). The consistency of dough when worked by machine was improved. The consistency of commercial lecithin is pasty to fluid. For better handling in baking, lecithin is attached to flour-like ingredients. However good baking results are not provided every time since the quality and composition of lecithin are uncertain depending on the origin of the lecithin being employed; due to the uncertain quality and composition of synthetic emulsifiers which were used to a greater extent.

Only through the use of synthetic emulsifiers, alone or in mixture with lecithin, variations in the properties of bakery goods scarcely occured wherein the dough was worked by machine. Preferred emulsifiers were mono- and diglycerides of diacetyl tartaric acid or mono- and diglycerides of fruit acids such as citric acid and lactic acid, as well as other emulsifiers, for example polyglycerol esters, partially or completely esterified with fatty acids.

Using synthetic emulsifiers which uniformly good properties are always obtained. However, quite recently an effort has been directed to put on the market foods which are free from synthetic components.

SUMMARY OF INVENTION

The present invention provides a baking agent for breakfast-roll doughs that includes an emulsifier obtained from a natural product which overcomes the drawbacks of the prior art lecithin emulsifier, and which gives reproducably improved properties in the baking behaviour and the breakfast-rolls.

The baking agent used as the sole emulsifier includes a purified deoiled phospholipid fraction wherein the proportion of phosphatidyl choline to phosphatidyl ethanolamine is greater than 1.

DETAILED DESCRIPTION OF THE PREFERRED EMBODIMENTS

The present invention includes a baking agent having a phospholipid fraction, wherein the proportion of phosphatidyl choline to phosphatidyl ethanolamine is greater than 1. The phospholipid fraction has the effect of an emulsifier. The fraction enables the formation of a fat/water emulsion so that the fat is better distributed and the receptivity of the dough for water can be increased, which in turn gives an improved dough structure.

In contrast with the prior art emulsifiers, such as diacetyl tartrates, which activate the growth of yeast until the balance has been adjusted, the phospholipid fraction of the present invention varies the dough structure by changing the viscosity. By using the present invention the dough achieves the same volume as with a synthetic emulsifier. The individual phospholipids in the phospholipid fraction of the present invention are more effective to the flour components, such as proteins, starch and mucilages bringing many improvements of properties. Thus, the crumb of the finished dough becomes weaker, the volume becomes greater, the pores become finer and the pore walls become thinner. Also the fermentation of the dough is influenced so that an interruption of the fermentation is possible. The finished baked products can be removed better from the amount of pastry mold and the time the baked products retained freshness is longer.

Until now, it has not been clear that by using a phospholipid fraction in which the portion of phosphatidyl choline to phosphatidyl ethanolamine is greater than approximately 1, a particular good improvement of properties is obtained.

Phospholipid fractions are preferred which contain 75 to 95% by weight phospholipids and 5 to 25% by weight sterols, sterol glycosides, sugar and/or mono-, di- or triglycerides, whereby the portion of phosphatidyl choline to phosphatidyl ethanolamine is in the range of 1.1:1 to 10:1.

Preferred are phospholipid fractions which contain approximately 23 to 80% by weight phosphatidyl choline, 5 to 35% by weight phosphatidyl ethanolamine and as additional phospholipids such as lysophosphatidyl choline, lysophosphatidyl enthanolamine, lysophosphatidyl inositol, phosphatidyl inositol, phosphatide acid, lysophosphatide acid, phosphatidyl glycerol, N-acylphosphatidyl ethanolamine or lysophosphatidyl glycerol.

Particularly preferred are phospholipid fractions which contain approximately

- 23 to 80 weight % phosphatidyl choline
- 5 to 35 weight % phosphatidyl ethanolamine
- 3 to 15 weight % N-acylphosphatidyl enthanolamine
- 5 to 25 weight % further phospholipids, sterols, sterolglycosides, sugar and triglycerides, whereby the triglyceride content is a max. of 5%.

The phospholipid fractions can be obtained in accordance with known processes as disclosed in DE-OS 03 47 012 and DE-OS 30 47 011 from soja beans, rape, sunflower kernel and other oliferous seeds and oilseeds; however the preferred parent material is soja beans.

The phospholipid fractions are obtained preferrably by extraction of crude lecithin (for example crude soja lecithin) with ethanol at a temperature of about 75° C. The components soluble in ethanol are separated from the unsoluble components and after sedimentation at low temperature are subjected to column chromatography on silica gel according to EP 0054770.

By varying the extraction- and column chromatography- conditions, the ratio of phosphatidyl choline to phosphatidyl ethanolamine can be adjusted as desired, particularly to a range of 2:1 to 10:1.

Generally, the phospholipid fraction is present in the baking agent in an amount in the range of 0.05 to 25%, preferably in an amount of 0.2 to 7.5%.

the baking agent of the present invention has a long shelf life. When produced with a fat which is free from lipase and lipoxidase and includes at least 40% sugar, the baking agent has a shelf life of at least 1 year.

As indicated from the example set forth below, a breakfast-roll dough prepared with a baking agent containing the phospholipid fraction according to the invention gives little better bake-results than a breakfast-roll dough prepared with a baking agent with a synthetic emulsifier. In contrast to commercial crude lecithin, and deoiled crude lecithin, the phospholipid fraction according to the invention has not only the advantages of obtaining consistently uniform results by produces significantly better properties of dough and baked products; this will be seen from the comparitive example at the end of the specification.

The baking agent for breakfast-roll doughs can be prepared according to known processes and the processes discovered in the pending German patent application "Baking Agent For Leavened Dough" (application number P 36 16 597.2) and corresponding copending U.S. patent application Ser. No. 50,062 "Baking Agent For Leavened Dough" filed May 13, 1987.

In order to further illustrate the present invention, the following specific example is provided.

EXAMPLE 1

A pastry baking agent of the following composition was prepared:

| | |
|---|---|
| animal and vegetable fats | 300 kg |
| sugar | 280 kg |
| glucose | 197.6 kg |
| ascorbic acid | 1.3 kg |
| malt flour, containing enzyme | 1.1 kg |
| phospholipid fraction | 220 kg |

The phospholipid fraction had the following composition:

| | |
|---|---|
| phosphatidyl choline | 32-33% |
| phosphatidyl ethanolamine | 12-13% |
| N-acyl-phosphatidyl-ethanolamine (N-acyl-PE) | 6-8% |
| other phospholipids, sterols, sterolglycosides, sugar and triglycerides | 35-38% |
| Acid number (AN) | 24 |
| PC:PE = 1:0.4 | |

The phospholipid fraction was mixed with the molten fat and combined with the remaining components at a temperature of 60° C. and homogenized by cycling in a pump installation and cooled down gradually.

Breakfast-roll doughs were prepared having the following composition:
- 200 g flour, type 550,
- 1200 g (ml) water
- 100 g yeast
- 40 salt.

Into this breakfast-roll dough 60 g of the baking agent described above was kneaded in a spiral kneader for 6 minutes. Process conditions included a dough resting time of 5 to 15 minutes, a dough yield of 161, a dough charge of 1600 g, a fermentation time of 4 minutes, a dough temperature of 26° C., an oven temperature of 240° C., and a baking time of 20 minutes.

| Baking results: | | |
|---|---|---|
| | Baking agent according to the invention | Prior art baking agent* |
| Bakery volume ml normal fermentation | 8650 | 8420 |
| Bakery volume ml over-fermentation 9240 | | 9180 |
| Browning | normal | normal, still good |
| Distribution of pores | rather uniform | rather uniform |
| Crumb elasticity | stabile elastic | stabile elastic |
| Taste | very good rounded strong | some flat |

*Product based on the emulsifier-combination mono- and diglycerides blended with crude lecithin and diacetyl tartrate.

EXAMPLE 2

To determine the difference between a baking agent prepared with commercial crude lecithins and a phospholipid fraction according to the invention, the following comparison test was made.

Three baking agents having the same composition as set forth in example 1 were prepared, except that:
1. in baking agent A, a crude lecithin was included which was not de-oiled (commercial product)

2. in baking agent B, a crude lecithin was included which was de-oiled (commercial product)
3. in baking agent C, a phospholipid fraction according to the invention was included.

Breakfast-roll doughs were prepared, having the same composition as stated in example 1 were divided in portions of 1560 g; into one of each portions was kneaded 60 g of baking agent A, baking agent B and baking agent C, respectively. The baking conditions were the same as in the example above.

The bake results are set forth in the following table.

| Breakfast-roll dough prepared with Baking agent A: | |
| --- | --- |
| Normal fermentation Volume/ml: | 7.800 |
| Over-fermentation Volume/ml: | 8.220 |
| Dough yield: | 157 |
| Dough properties: | stable, some moist |
| Crumb elasticity: | stable |
| Browning of the bakeries: | normal |
| Breakfast-roll dough prepared with Baking agent B: | |
| Normal fermentation Volume/ml: | 7.810 |
| Over-fermentation Volume/ml: | 7.830 |
| Dough yield: | 157 |
| Dough properties: | stable, elastic |
| Crumb elasticity: | stable |
| Browning of the bakeries: | normal |
| Breakfast-roll dough prepared with Baking agent C: | |
| Normal fermentation Volume/ml: | 8.700 |
| Over-fermentation Volume/ml: | 9.000 |
| Dough yield: | 158 |
| Dough properties: | dry/stable/elastic |
| Crumb elasticity: | stable/elastic |
| Browning of the bakeries: | normal/strong |

The results demonstrate that a baking agent containing a de-oiled crude lecithin has a good effect on the dough properties in comparison to a baking agent containing a crude lecithin which is not de-oiled. However, in using a baking agent containing the phospholipid fraction according to the invention, a significant improvement is obtained with regard to normal fermentation, over-fermentation, the dough properties and the properties of the finished breakfast-roll.

although the present invention has been described with reference to preferred embodiments, workers skilled in the art will recognize that changes may be made in form and detail without departing from the spirit and scope of the invention.

What is claimed is:

1. A baking agent for the use in breakfast rolls, the baking agent comprising:
   a fat component and/or flour, sugar;
   a phospholipid fraction containing phosphatidyl choline and phosphatidyl ethanolamine, wherein the phospholipid fraction contains:
   23–80% by weight phosphatidyl choline;
   5–35% by weight phosphatidyl ethanolamine;
   3–15% by weight N-acylphosphatidyl ethanolamine; and
   5–25% by weight other phospholipids, sterols, sterolgylcosides, sugar and triglycerides.

2. The baking agent of claim 1 wherein the phospholipid fraction further includes lysophosphatidyl choline, lysophosphatidyl ethanolamine, lysophosphatidyl inositol, phosphatidyl inositol, phosphatide acid, lysophosphatide acid, phosphatidyl glycerol, lysophosphatidyl glycerol, N-acylphosphatidyl ethanolamine and lyso-N-acylphosphatidyl ethanolamine and/or monoglycerides, diglycerides or triglycerides.

3. The baking agent of claim 1 wherein the phospholipid fraction contains less than 5% by weight triglycerides.

4. The baking agent of claim 1 wherein the phospholipid fraction is in an amount of from 0.05 to 25% by weight of the baking agent.

5. The baking agent of claim 1 wherein the phospholipid fraction is in an amount of from 0.2 to 7.5% by weight of the baking agent.

* * * * *

UNITED STATES PATENT AND TRADEMARK OFFICE
CERTIFICATE OF CORRECTION

PATENT NO. : 5,176,935
DATED : January 5, 1993
INVENTOR(S) : HEINZ D. JODLBAUER

It is certified that error appears in the above-identified patent and that said Letters Patent is hereby corrected as shown below:

On the Title Page, delete:

[73] Assignees: Vereinigte Kunstmuhlen AG; A. Nattermann & Cie. GmbH, both of Fed. Rep. or Germany insert:

[73] Assignees: Kampffmeyer Muhlen GmbH; Vereinigte Kunstmuhlen AG; A. Nattermann & Cie. GmbH, all of Fed. Rep. of Germany Signed and Sealed this Second Day of November, 1993

Attest:

BRUCE LEHMAN

Attesting Officer

Commissioner of Patents and Trademarks